United States Patent
Lee et al.

(10) Patent No.: US 10,020,671 B2
(45) Date of Patent: Jul. 10, 2018

(54) MAGNETIC SHEET FOR WIRELESS POWER CHARGING SYSTEM

(71) Applicant: SAMSUNG ELECTRO-MECHANICS CO., LTD., Suwon-si, Gyeonggi-do (KR)

(72) Inventors: Seung Min Lee, Suwon-si (KR); Jong Ho Chung, Suwon-si (KR); Jung Young Cho, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 176 days.

(21) Appl. No.: 15/065,384

(22) Filed: Mar. 9, 2016

(65) Prior Publication Data

US 2016/0344222 A1 Nov. 24, 2016

(30) Foreign Application Priority Data

May 22, 2015 (KR) .................. 10-2015-0072154
Aug. 28, 2015 (KR) .................. 10-2015-0121471

(51) Int. Cl.
*H02J 7/00* (2006.01)
*H02J 7/02* (2016.01)
(Continued)

(52) U.S. Cl.
CPC ............ *H02J 7/025* (2013.01); *H01F 38/14* (2013.01); *H02J 7/0042* (2013.01); *H02J 50/10* (2016.02)

(58) Field of Classification Search
CPC ...................................................... H02J 7/025
(Continued)

(56) References Cited

U.S. PATENT DOCUMENTS 9,793,741 B2 * 10/2017 Yeo .................. H02J 7/025
2012/0319647 A1 * 12/2012 Itabashi ............ H02M 3/33553
320/108

(Continued)

FOREIGN PATENT DOCUMENTS

KR 10-2013-0072181 A 7/2013
KR 10-2014-0109336 A 9/2014
KR 10-1481042 B1 1/2015

*Primary Examiner* — Suchin Parihar
(74) *Attorney, Agent, or Firm* — McDermott Will & Emery LLP

(57) ABSTRACT

A magnetic sheet for a wireless power charging system includes an electrode layer, first and second magnetic layers disposed on the electrode layer, and first and second adhesive layers disposed on the electrode layer. The first adhesive layer is disposed between the electrode layer and the first magnetic layer, and the second adhesive layer is disposed between the first and second magnetic layers. In one example, the first and second adhesive layers each include a plurality of core loss decreasing members, formed of at least one of an amorphous material, a ferrite material, and a synthetic material of amorphous and ferrite materials, dispersed therein. In another example, the first and second adhesive layers each include a plurality of magnetic saturation (Ms) reinforcing members, formed of at least one of a hetero-amorphous material, a nanocrystalline-amorphous material, and a synthetic material of hetero-amorphous and nanocrystalline-amorphous materials, dispersed therein.

20 Claims, 2 Drawing Sheets

(51) Int. Cl.
*H01F 38/14*     (2006.01)
*H02J 50/10*     (2016.01)

(58) Field of Classification Search
USPC .......................................................... 320/108
See application file for complete search history.

(56) References Cited

U.S. PATENT DOCUMENTS

| | | | | |
|---|---|---|---|---|
| 2014/0362505 | A1* | 12/2014 | Jang | .................... H05K 9/0075 |
| | | | | 361/679.4 |
| 2015/0102892 | A1* | 4/2015 | Yeo | .................... H01F 1/14716 |
| | | | | 336/200 |
| 2015/0124402 | A1* | 5/2015 | Jang | ........................ B32B 27/08 |
| | | | | 361/679.55 |
| 2016/0036264 | A1* | 2/2016 | Bae | ......................... H02J 7/025 |
| | | | | 320/108 |

\* cited by examiner

MAGNETIC SHEET FOR WIRELESS POWER CHARGING SYSTEM

CROSS-REFERENCE TO RELATED APPLICATION

This application claims the priority and benefit of Korean Patent Application No. 10-2015-0072154, filed on May 22, 2015 and Korean Patent Application No. 10-2015-0121471, filed on Aug. 28, 2015 with the Korean Intellectual Property Office, the disclosures of which are incorporated herein by reference.

BACKGROUND

The present disclosure relates to a magnetic sheet for a wireless power charging system.

In parallel with the reduction in the weights of electronic devices due to miniaturization, non-contact power charging methods for charging a battery using magnetic coupling without electrical contact have been developed. Such non-contact power charging methods include wireless power charging methods.

The wireless power charging method, which is a method of charging a battery using electromagnetic induction, charges a battery by converting into energy the power generated by inductive coupling between a primary coil (e.g., a transmitter coil provided in a charger such as a wireless power transmission device) and a secondary coil (e.g., a receiver coil provided in an object to be charged, such as a wireless power reception device).

For wireless power charging purposes, a magnetic sheet may be disposed between the receiver coil and the battery. The magnetic sheet may increase the efficiency of transmission of electromagnetic waves generated from the wireless power transmission device to the wireless power reception device, and may thereby increase power charging efficiency.

Meanwhile, since the receiver coil is formed of copper (Cu) having low resistance in order to improve magnetic induction therein, the magnetic sheet should have high magnetic saturation Ms and permeability μ' values, and low core loss and magnetic force loss, in order to significantly increase power charging efficiency.

SUMMARY

An aspect of the present disclosure may provide a magnetic sheet for a wireless power charging system having high magnetic saturation Ms and permeability μ' values, and low core loss and magnetic force loss.

According to an aspect of the present disclosure, a magnetic sheet for a wireless power charging system may include adhesive layers in which core loss decreasing members formed of at least one of an amorphous material, a ferrite material, and a synthetic material of amorphous and ferrite materials are dispersed.

According to another aspect of the present disclosure, a magnetic sheet for a wireless power charging system may include adhesive layers in which magnetic saturation (Ms) reinforcing members, formed of at least one of a hetero-amorphous material, a nanocrystalline-amorphous material, and a synthetic material of hetero-amorphous and nanocrystalline-amorphous materials, are dispersed.

According to a further aspect of the present disclosure, a wireless power reception device may include a receiver coil, a battery, and a magnetic sheet having a stacked structure and disposed between the receiver coil and the battery. The magnetic sheet having the stacked structure includes a base layer, a first adhesive layer disposed on the electrode layer, a first magnetic layer disposed on the first adhesive layer, a second adhesive layer disposed on the first magnetic layer, and a second magnetic layer disposed on the second adhesive layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
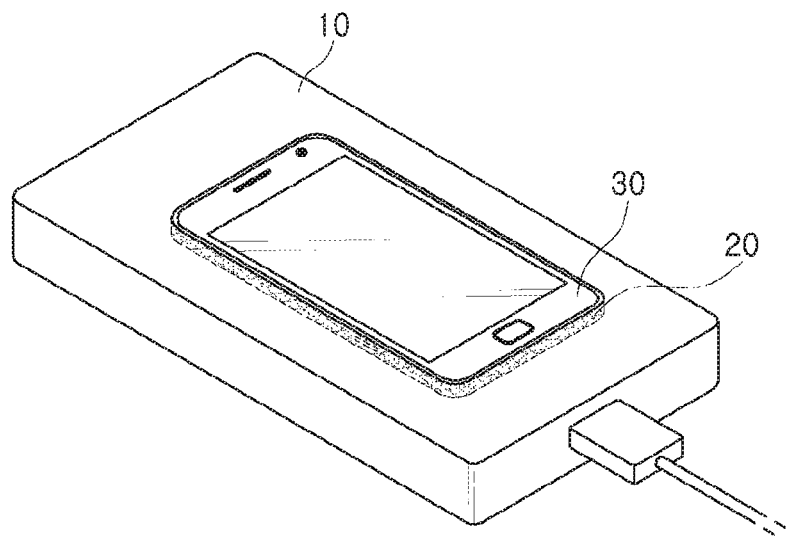
FIG. 1 is a perspective view illustrating an exterior of a wireless power charging system.
Figure 2:
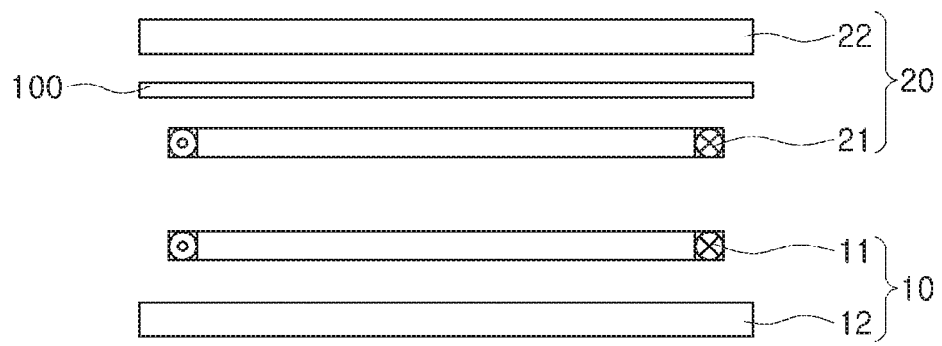
FIG. 2 is an exploded cross-sectional view illustrating the main internal configuration of the wireless power charging system of FIG. 1.

FIG. 1 is a perspective view illustrating an exterior of a general wireless power charging system, and FIG. 2 is an exploded cross-sectional view illustrating main internal configurations of FIG. 1.

Referring to FIGS. 1 and 2, the wireless power charging system may be composed of a wireless power transmission device 10 and a wireless power reception device 20 of an electronic apparatus, wherein the wireless power reception device 20 may be an electronic device 30 such as a mobile phone, a laptop computer, a tablet personal computer (PC), or the like.

Describing an interior of the wireless power transmission device 10, a transmitter coil 11 may be formed on aboard 12. Thus, when an alternating current (AC) voltage is applied to the wireless power transmission device 10 (and specifically, to the transmitter coil 11 of the transmission device 10), a magnetic field may be formed therearound. Therefore, electromotive force induced from the magnetic field produced by the transmitter coil 11 may be generated in a receiver coil 21 embedded in the wireless power reception device 20. The induced electromotive force can be used to charge a battery 22 located in the wireless power reception device 20.

The battery 22 may be a rechargeable nickel hydrogen battery or a rechargeable lithium ion battery, but is not limited thereto. Further, the battery 22 maybe configured separately from the wireless power reception device 20 to thereby be detachably configured in the wireless power reception device 20, or the battery 22 and the wireless power reception device 20 may be implemented integrally with each other.

The transmitter coil 11 and the receiver coil 21 may be electromagnetically coupled to each other and formed by winding a metal wire such as copper, or the like. In this case, the metal wire may be wound in a circular shape, an oval shape, a tetragonal shape, a diamond shape, or the like, and an entire size or turns of the metal wire, or the like, may be suitably controlled and set depending on desired characteristics.

A magnetic sheet 100 according to the present exemplary embodiment may be disposed between the receiver coil 21 and the battery 22 and used to focus a magnetic flux, such that the magnetic flux can be efficiently received in the receiver coil 21. In addition, the magnetic sheet 100 may serve to block at least part of the magnetic flux produced by the transmitter coil 11 from reaching the battery 22. Hereinafter, the magnetic sheet 100 will be described in more detail.

Figure 3:
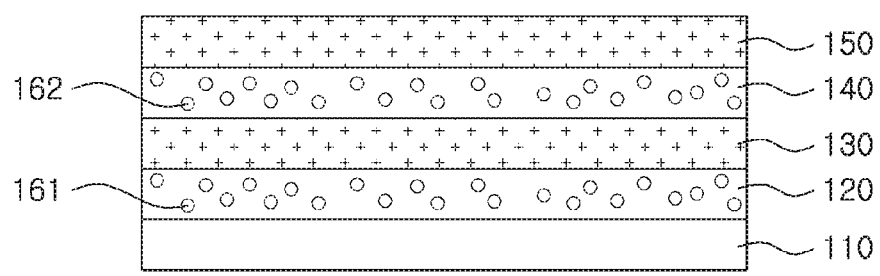
FIG. 3 is a cross-sectional view illustrating a stacking structure of a magnetic sheet according to an exemplary embodiment.

FIG. 3 is a cross-sectional view illustrating a stacked structure of a magnetic sheet 100 according to an exemplary embodiment.

Referring to FIG. 3, a magnetic sheet 100 according to the present exemplary embodiment may include an electrode layer 110, a plurality of adhesive layers 120 and 140, and a plurality of magnetic layers 130 and 150. According to the present exemplary embodiment, the magnetic sheet 100, which has a structure in which the number of adhesive layers is two and the number of magnetic layers is two, may have a structure in which the electrode layer 110, a first adhesive layer 120, a first magnetic layer 130, a second adhesive layer 140, and a second magnetic layer 150 are sequentially disposed from a lower portion of the magnetic sheet 100 to an upper portion thereof. However, the magnetic sheet 100 is not limited thereto, and if necessary, three or more magnetic layers and three or more adhesive layers may be used in the magnetic sheet 100.

The electrode layer 110, which is a portion connected to (or most proximate to) a surface of the receiver coil 21, may be formed of, for example, a ferrite sheet, or the like.

As the first and second magnetic layers 130 and 150, a thin-plate metal ribbon containing at least one of an amorphous alloy or a nanocrystalline alloy may be used.

As the amorphous alloy, an Fe-based or Co-based magnetic alloy may be used. In addition, as the Fe-based magnetic alloy, for example, an Fe—Si—B alloy may be used.

When a magnetic layer is manufactured, the higher a content of a metal including Fe, the higher the saturation of magnetic flux density. However, in a case in which a content of Fe is excessively high, it is difficult to form an amorphous phase. Therefore, the content of Fe may be, for example, 70 to 90 atomic %. In such a situation, when a sum of contents of Si and B is in a range of 10 to 30 atomic %, the amorphous forming ability of the alloy may be optimal.

An anti-corrosive element such as chromium (Cr), cobalt (Co), and the like, may be added to a basic composition as described above within a range of 20 atomic % in order to prevent corrosion, and if necessary, a small amount of another metal element may be contained in order to further impart other characteristics.

Further, an Fe-based nanocrystalline magnetic alloy may be used as the nanocrystalline alloy. For example, an Fe—Si—B—Cu—Nb alloy may be used as the Fe-based nanocrystalline alloy.

The first adhesive layer 120 may serve to adhere the electrode layer 110 and the first magnetic layer 130 to each other. The first adhesive layer 120 may be formed of, for example, an acrylic adhesive, but is not limited thereto.

A plurality of first core loss decreasing members 161 may be dispersed and contained in the first adhesive layer 120. The first core loss decreasing members 161 may serve to decrease hysteresis loss and thereby decrease energy loss.

The first core loss decreasing members 161 as described above may contain at least one of an amorphous material, a ferrite material, and a synthetic material of amorphous and ferrite materials. Meanwhile, if necessary, the first core loss decreasing member 161 may be in a state in which the amorphous material, the ferrite material, and the synthetic material of amorphous and ferrite materials are mixed with each other. When the first core loss decreasing member 161 is in a hybrid form as described above, it may be easier to manufacture the magnetic sheet 100 so that desired permeability and energy loss rate are exhibited.

Further, as an example, the first core loss decreasing member 161 may be in a powder form. When the first core loss decreasing member 161 is manufactured in the powder form as described above, a difference in a degree of magnetization through hysteresis may be further increased by an oxide film formed on a surface of the powder, and thus a μ' value of the magnetic sheet 100 may be increased. As such, core loss and magnetic force loss thereof may be further decreased.

Here, in a case in which the first core loss decreasing member 161 is in the powder form, the first core loss decreasing member 161 may contain 70 to 84.4 atomic % of iron (Fe), 7 to 15 atomic % of silicon (Si), 5 to 10 atomic % of boron (B), and 3 to 5 atomic % of niobium (Nb) or 3 to 5 atomic % of phosphorus (P). Further, if necessary, the first core loss decreasing member may further contain 1 atomic % or less of copper (Cu). According to the present exemplary embodiment, in a case in which a content of each ingredient is outside of the corresponding critical value range cited above, it may be difficult to manufacture an amorphous or nanocrystalline first core loss decreasing member having a μ' value, core loss, and magnetic force loss desired by a user.

As another example, the first core loss decreasing member 161 may be in a flake form. In a case in which the first core loss decreasing member 161 is formed of an Fe based material, for example, it may be difficult to manufacture powder having a content of Fe that is 80 wt % or more. Further, in a case in which the content of Fe is excessively high, it may be difficult to manufacture a sheet shaped ribbon having a width of 4 cm to 6 cm, which is currently used. Therefore, in this case, a first core loss decreasing member being in a flake form, obtained by crushing a ribbon, may be used.

In a case in which the first core loss decreasing member 161 is in the flake form as described above, the first core loss decreasing member 161 may contain 80 to 87 atomic % of iron (Fe), 4 to 7 atomic % of silicon (Si), 3 to 5 atomic % of boron (B), and 3 to 5 atomic % of niobium (Nb) or 3 to 5 atomic % of phosphorus (P). Further, if necessary, the first core loss decreasing member 161 may further contain 1 atomic % or less of copper (Cu). According to the present exemplary embodiment, in a case in which a content of each ingredient is outside of the corresponding critical value range cited above, it may be difficult to manufacture an amorphous or nanocrystalline first core loss decreasing member having a μ' value, core loss, and magnetic force loss desired by the user.

The second adhesive layer 140 may serve to adhere the first and second magnetic layers 130 and 150 to each other. The second adhesive layer 140 may be formed of, for example, an acrylic adhesive, but is not limited thereto.

A plurality of second core loss decreasing members 162 may be dispersed and contained in the second adhesive layer 140. The second core loss decreasing members 162 may serve to decrease hysteresis loss and thereby decrease energy loss.

The second core loss decreasing members 162 as described above may contain at least one of an amorphous material, a ferrite material, and a synthetic material of amorphous and ferrite materials.

Meanwhile, if necessary, the second core loss decreasing member 162 may be in a state in which the amorphous material, the ferrite material, and the synthetic material of amorphous and ferrite materials are mixed with each other.

Further, as an example, the second core loss decreasing member 162 may be in a powder form. When the second core loss decreasing member 162 is manufactured in the powder form as described above, a difference in a degree of magnetization through hysteresis may be further increased by an oxide film formed on a surface of the powder. Thus, the μ' value of the magnetic sheet 100 may be increased, and core loss and magnetic force loss thereof may be further decreased.

In a case in which the second core loss decreasing member 162 is in the powder form, the second core loss decreasing member 162 may contain 70 to 79.9 atomic % of iron (Fe), 7 to 15 atomic % of silicon (Si), 5 to 10 atomic % of boron (B), and 3 to 5 atomic % of niobium (Nb) or 3 to 5 atomic % of phosphorus (P). Further, if necessary, the second core loss decreasing member 162 may further contain 1 atomic % or less of copper (Cu). According to the present exemplary embodiment, in a case in which a content of each ingredient is outside of the corresponding critical value range detailed above, it may be difficult to manufacture an amorphous or nanocrystalline second core loss decreasing member having a μ' value, core loss, and magnetic force loss desired by the user.

As another example, the second core loss decreasing member 162 may be in a flake form. In a case in which the second core loss decreasing member 162 is formed of an Fe based material, it may be difficult to manufacture powder having a content of Fe that is 80 wt % or more. Further, in a case in which the content of Fe is excessively high, it may be difficult to manufacture a sheet shaped ribbon having a width of 4 cm to 6 cm, which is currently used. Therefore, in this case, a second core loss decreasing member being in a flake form, obtained by crushing a ribbon, may be used.

In a case in which the second core loss decreasing member 162 is in the flake form, the second core loss decreasing member 162 may contain 80 to 87 atomic % of iron (Fe), 4 to 7 atomic % of silicon (Si), 3 to 5 atomic % of boron (B), and 3 to 5 atomic % of niobium (Nb) or 3 to 5 atomic % of phosphorus (P). Further, if necessary, the second core loss decreasing member 162 may further contain 1 atomic % or less of copper (Cu). According to the present exemplary embodiment, in a case in which a content of each ingredient is outside of the corresponding critical value range cited above, it may be difficult to manufacture an amorphous or nanocrystalline second core loss decreasing member having a μ' value, core loss, and magnetic force loss desired by the user.

The first and second core loss decreasing members 161 and 162 may serve to increase magnetic saturation Ms of the first and second adhesive layers 120 and 140 serving only as the existing dielectric material, respectively. Thus, the magnetic sheet 100 may have a compact structure. In addition, the first and second core loss decreasing members 161 and 162 may increase the μ' value of the magnetic sheet 100 and decrease core loss and magnetic force loss, thereby improving wireless power charging efficiency.

Further, as Ms and μ' values of the magnetic sheet 100 may be suitably controlled by the first and second core loss decreasing members 161 and 162, a Q factor of the magnetic sheet 100 may be improved. Therefore, in a case in which thicknesses of magnetic sheets are equal to each other, since permeability is improved as compared to a magnetic sheet according to the related art (e.g., relative to a structure in which there is no core loss decreasing member 161 or 162), when a wireless power charging system is constructed, power charging efficiency optimized for each system may be controlled.

Meanwhile, the magnetic saturation Ms or μ' values of the magnetic sheet 100 may be further increased, and core loss and magnetic force loss thereof may be further decreased by performing free annealing or annealing to densify a structure of the magnetic sheet 100.

In this case, limitation may be generated depending on the content of iron (Fe) contained in the magnetic sheet 100. For example, as the content of iron is increased or decreased, amorphous ribbon forming ability, such as a cooling rate limit, may be decreased. As a result, it may be difficult to manufacture the magnetic sheet 100 so as to have an area desired by a user.

Figure 4:
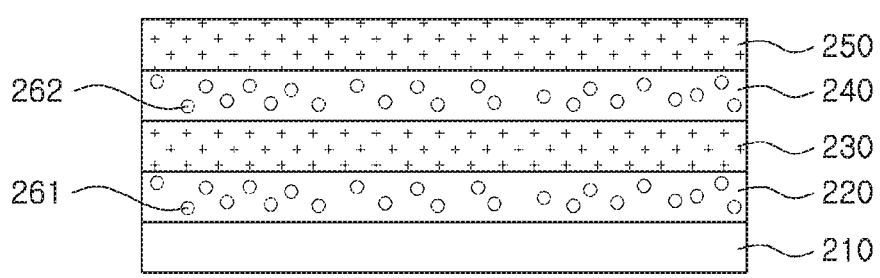
FIG. 4 is a cross-sectional view illustrating a stacking structure of a magnetic sheet according to another exemplary embodiment.

FIG. 4 is a cross-sectional view illustrating a stacking structure of a magnetic sheet according to another exemplary embodiment. Here, a detailed description of the same configuration as that of the exemplary embodiment described above will be omitted in order to avoid an overlapping description.

Referring to FIG. 4, in a magnetic sheet 200 according to the present exemplary embodiment, first and second magnetic layers 230 and 250 may be formed using a thin-plate metal ribbon containing an amorphous alloy or a nanocrystalline amorphous alloy.

A first adhesive layer 220 may serve to adhere an electrode layer 210 and the first magnetic layer 230 to each other, and a second adhesive layer 240 may serve to adhere the first and second magnetic layers 230 and 250 to each other.

In addition, a plurality of first and second magnetic saturation (Ms) reinforcing members 261 and 262 may be dispersed and contained in the first and second adhesive layers 220 and 240, respectively.

The first and second Ms reinforcing members 261 and 262 may contain at least one of a hetero-amorphous material or a nanocrystalline-amorphous material in which a content of iron (Fe) is high, and a synthetic material formed of hetero-amorphous and nanocrystalline-amorphous materials.

In a case of the hetero-amorphous material, since a heat treatment temperature is different depending on each composition, the first and second Ms reinforcing members 261 and 262 may be laminated and contained in the first and second adhesive layers 220 and 240 after heat treatment. According to the present exemplary embodiment, coercivity of the first and second magnetic layers 230 and 250 may be controlled by using the hetero material.

In addition, as an example, the first and second Ms reinforcing members 261 and 262 may be in a powder form, and as another example, the first and second Ms reinforcing members 261 and 262 may be in a flake form.

The first and second Ms reinforcing members 261 and 262 may reinforce an Ms value of the magnetic sheet 200 to allow the magnetic sheet 200 to have a compact structure. In addition, the first and second Ms reinforcing members 261 and 262 may further increase a μ' value of the magnetic sheet 200 and further decrease core loss and magnetic force loss to improve a Q factor, thereby further improving power charging efficiency.

Further, the first and second Ms reinforcing members 261 and 262 may prevent amorphous ribbon forming ability in the first and second magnetic layers 230 and 250, such as a cooling rate limit, from being decreased. Thus, the magnetic sheet 200 may be manufactured so as to have an area desired by a worker.

As set forth above, according to exemplary embodiments, the plurality of core loss decreasing members formed of at least one of the amorphous material, the ferrite material, and the synthetic material of amorphous and ferrite materials are dispersed and contained in the adhesive layers. Thus, the magnetic sheet may have high Ms and µ' values and low core loss and magnetic force loss, thereby improving power charging efficiency.

While exemplary embodiments have been shown and described above, it will be apparent to those skilled in the art that modifications and variations could be made without departing from the scope of the present invention as defined by the appended claims.

What is claimed is:

1. A magnetic sheet for a wireless power charging system comprising:
   an electrode layer;
   first and second magnetic layers disposed on the electrode layer; and
   first and second adhesive layers disposed on the electrode layer,
   wherein the first adhesive layer is disposed between the electrode layer and the first magnetic layer and the second adhesive layer is disposed between the first and second magnetic layers, and
   wherein the first and second adhesive layers each include a plurality of core loss decreasing members dispersed therein, and the plurality of core loss decreasing members are separate and distinct from the first and second magnetic layers and are formed of at least one of an amorphous material, a ferrite material, and a synthetic material of amorphous and ferrite materials.

2. The magnetic sheet for a wireless power charging system of claim 1, wherein the electrode layer is a ferrite sheet.

3. The magnetic sheet for a wireless power charging system of claim 1, wherein each of the first and second magnetic layers is a thin-plate metal ribbon containing at least one of an amorphous alloy or a nanocrystalline alloy.

4. The magnetic sheet for a wireless power charging system of claim 1, wherein the core loss decreasing members are in a powder form.

5. The magnetic sheet for a wireless power charging system of claim 4, wherein the core loss decreasing members contain 70 to 84.4 atomic % of iron (Fe), 7 to 15 atomic % of silicon (Si), 5 to 10 atomic % of boron (B), and 3 to 5 atomic % of at least one of niobium (Nb) and phosphorus (P).

6. The magnetic sheet for a wireless power charging system of claim 1, wherein the core loss decreasing members are in a flake form.

7. The magnetic sheet for a wireless power charging system of claim 6, wherein the core loss decreasing members contain 80 to 87 atomic % of iron (Fe), 4 to 7 atomic % of silicon (Si), 3 to 5 atomic % of boron (B), and 3 to 5 atomic % of at least one of niobium (Nb) and phosphorus (P).

8. A magnetic sheet for a wireless power charging system comprising:
   an electrode layer;
   first and second magnetic layers disposed on the electrode layer; and
   first and second adhesive layers disposed on the electrode layer,
   wherein the first adhesive layer is disposed between the electrode layer and the first magnetic layer and the second adhesive layer is disposed between the first and second magnetic layers, and
   wherein the first and second adhesive layers each include a plurality of magnetic saturation (Ms) reinforcing members dispersed therein, the plurality of core loss decreasing members are separate and distinct from the first and second magnetic layers, and the plurality of core loss decreasing members are formed of at least one of a hetero-amorphous material, a nanocrystalline-amorphous material, and a synthetic material of hetero-amorphous and nanocrystalline-amorphous materials.

9. The magnetic sheet for a wireless power charging system of claim 8, wherein the Ms reinforcing members are in a powder form.

10. The magnetic sheet for a wireless power charging system of claim 8, wherein the Ms reinforcing members are in a flake form.

11. A wireless power reception device comprising:
    a receiver coil;
    a battery; and
    a magnetic sheet having a stacked structure and disposed between the receiver coil and the battery,
    wherein the magnetic sheet having the stacked structure includes a base layer, a first adhesive layer disposed on the electrode layer, a first magnetic layer disposed on the first adhesive layer, a second adhesive layer disposed on the first magnetic layer, and a second magnetic layer disposed on the second adhesive layer, and
    wherein the first and second adhesive layers each include a plurality of core loss decreasing members dispersed therein, and the plurality of core loss decreasing members are separate and distinct from the first and second magnetic layers.

12. The wireless power reception device of claim 11, wherein the base layer is an electrode layer comprising a ferrite sheet, and the base layer is disposed between the first adhesive layer and the receiver coil.

13. The wireless power reception device of claim 11, wherein the first and second magnetic layers each include a thin-plate metal ribbon including at least one of an amorphous alloy or a nanocrystalline alloy.

14. The wireless power reception device of claim 13, wherein the amorphous alloy is an Fe—Si—B magnetic alloy having a content of Fe of 70 to 90 atomic % and a sum of contents of Si and B of 10 to 30 atomic %.

15. The wireless power reception device of claim 11, wherein the first and second adhesive layers each include an acrylic adhesive having the plurality of core loss decreasing members dispersed therein, and
    the core loss decreasing members contain at least one of an amorphous material, a ferrite material, and a synthetic material of amorphous and ferrite materials.

16. The wireless power reception device of claim 11, wherein the core loss decreasing members include powder particles having an oxide film formed on a surface thereof.

17. The wireless power reception device of claim 11, wherein the core loss decreasing members include copper (Cu).

18. The wireless power reception device of claim 11, wherein the first adhesive layer is disposed directly on the electrode layer, the first magnetic layer is disposed directly on the first adhesive layer, the second adhesive layer is disposed directly on the first magnetic layer, and the second magnetic layer is disposed directly on the second adhesive layer.

19. The magnetic sheet for a wireless power charging system of claim 1, wherein the core loss decreasing members are in a powder form and the core loss decreasing members contain 70 to 84.4 atomic % of iron (Fe), 7 to 15 atomic % of silicon (Si), 5 to 10 atomic % of boron (B), and 3 to 5 atomic % of phosphorus (P).

20. The magnetic sheet for a wireless power charging system of claim 1, wherein the core loss decreasing members are in a flake form and the core loss decreasing members contain 70 to 84.4 atomic % of iron (Fe), 7 to 15 atomic % of silicon (Si), 5 to 10 atomic % of boron (B), and 3 to 5 atomic % of phosphorus (P).

* * * * *